D. P. DAVIES.
TRACTOR.
APPLICATION FILED AUG. 20, 1920.
1,388,410.
Patented Aug. 23, 1921.
3 SHEETS—SHEET 3.
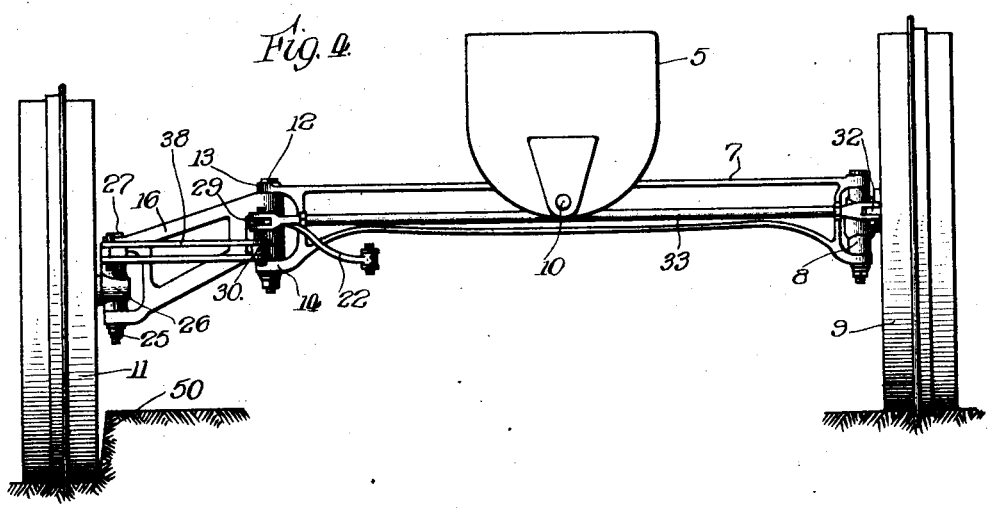
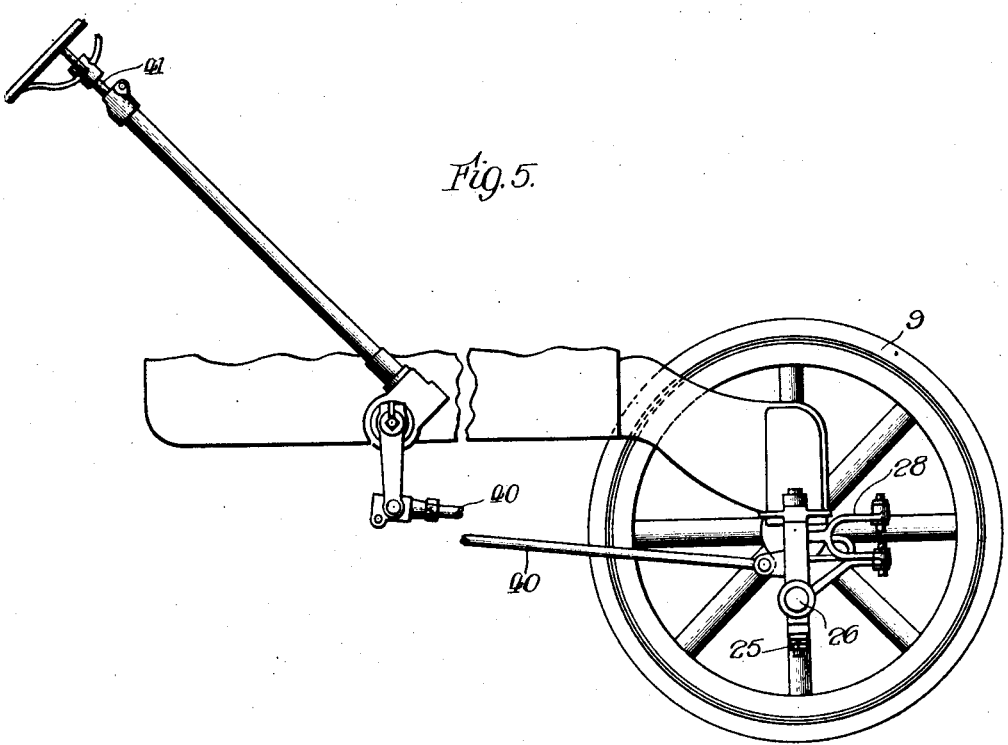
Witness:
A. J. Sanser.
Inventor:
David P. Davies,
By James A. Walsh,
Atty.

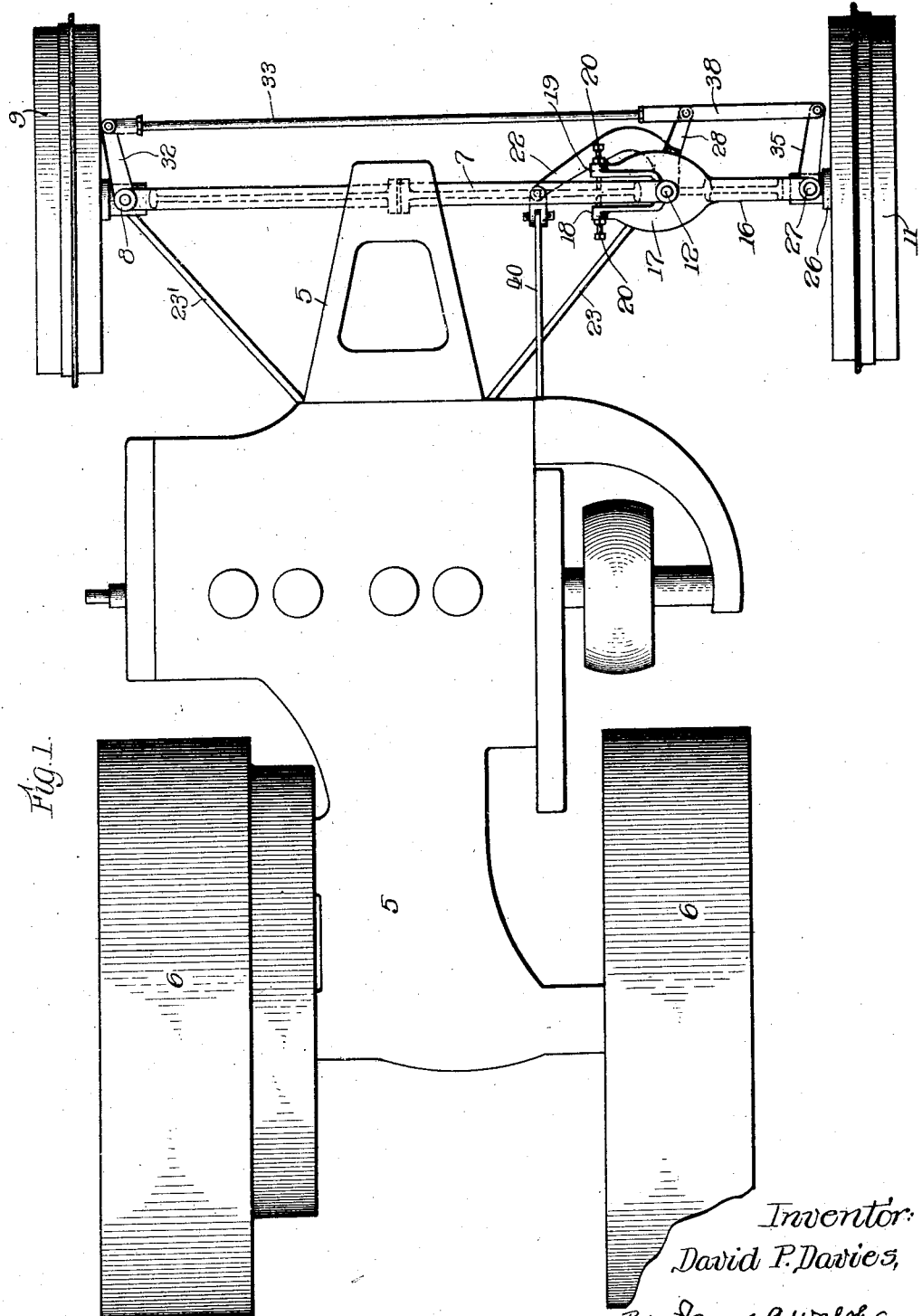

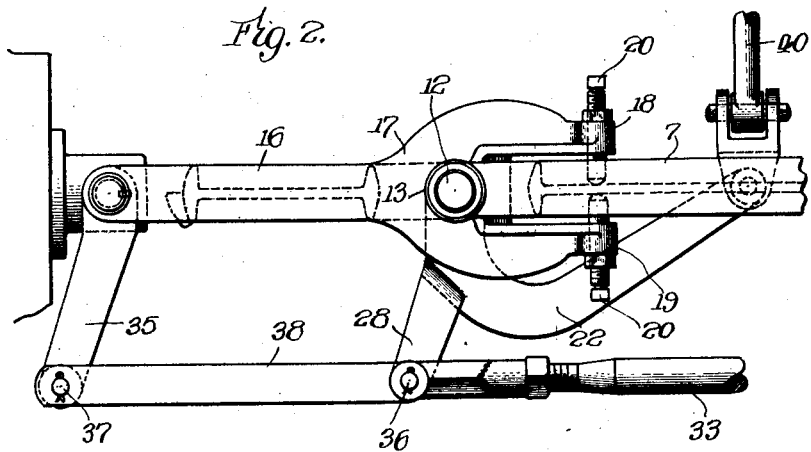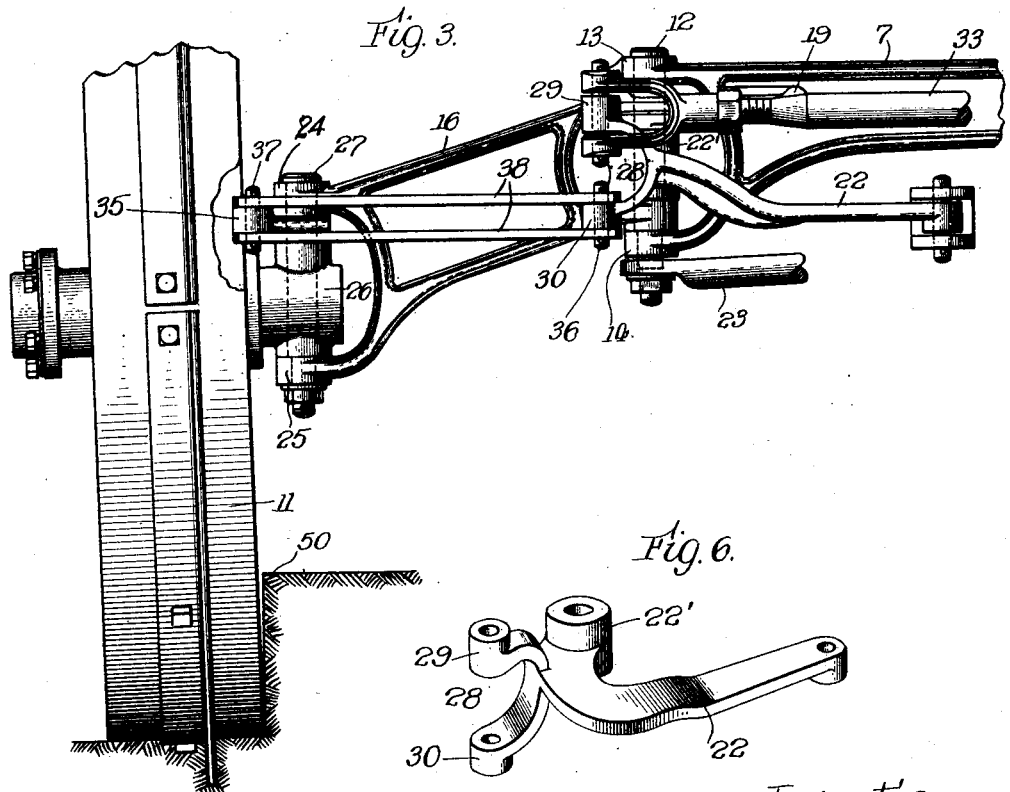

UNITED STATES PATENT OFFICE.

DAVID P. DAVIES, OF RACINE, WISCONSIN, ASSIGNOR TO J. I. CASE THRESHING MACHINE COMPANY, OF RACINE, WISCONSIN, A CORPORATION.

TRACTOR.

1,388,410. Specification of Letters Patent. Patented Aug. 23, 1921.

Application filed August 20, 1920. Serial No. 404,803.

*To all whom it may concern:*

Be it known that I, DAVID P. DAVIES, a citizen of the United States, residing at Racine, in the county of Racine and State of Wisconsin, have invented certain new and useful Improvements in Tractors, of which the following is a specification.

My present invention relates to improvements in farm tractors, and more particularly to the front axle thereof, for which I provide an axle extension to which a front wheel may be secured, and which arrangement permits of dropping such wheel into a furrow, at the same time maintaining the horizontal position of the tractor. Such wheel thus acts as a guide for steering the tractor, the remaining wheels thereof being maintained upon the unplowed ground. In carrying out my invention it is but necessary to remove one wheel from the front axle, attach the extension, and mount the wheel thereon, all of which can be readily accomplished.

In the accompanying drawings, forming part hereof, Figure 1 is a plan of a tractor of a well known type; Fig. 2 a plan of a portion thereof; Fig. 3 a front elevation of my improved extension, and the wheel and axle to which it is connected, in fragment; Fig. 4 a front elevation of the front axle and wheels; Fig. 5 a detail sectional view indicating the steering mechanism for directing the tractor, and Fig. 6 is a perspective of a steering knuckle having forked members forming part of my invention.

In said drawings, the portions marked, 5, indicate the tractor, and, 6, the rear driving wheels thereof. The front axle, 7, may be of any appropriate construction and arrangement, and in normal condition is provided with knuckles, as 8, adjacent the wheel, 9, and is secured to the tractor frame by a connection, as 10, or in any appropriate manner. When employing the tractor for plowing it becomes desirable to arrange one of the front wheels, 11, to act as a furrow guide by extending the same laterally and downwardly from the tractor, and at the same time maintaining the horizontal position thereof, as indicated in Fig. 4. This is accomplished by removing said wheel 11, the pin, 12, connecting the same to the forked members, 13, 14, of axle 7 being withdrawn for such purpose. I then connect to axle 7 an extension axle, 16, which is preferably provided with a horizontally arranged yoke, 17, the members, 18, 19, of which extend about each side of axle 7, and are secured thereto by the screw-bolts, 20. Said yoke is provided with a suitable aperture through which pin 12 is replaced to occupy the same relation to its connecting parts as before the removal of wheel 11, said parts comprising the knuckle-bearing, 22', and brace-rod, 23, a similar brace-rod, 23', connecting knuckle 8 to the tractor frame. The extension or supplemental axle 16 is so formed as to preferably incline downwardly from the main axle 7, it being secured to the forks 13, 14, of said axle by the pin 12, its lower end being also in forked formation having the members, 24, 25, for receiving and supporting the stud-axle, 26, of wheel 11, said stud-axle and forked members, 24, 25, being connected by means of pin, 27. An arm, 28, extends forwardly from the knuckle 22', its outer portion having the forked members, 29, 30, which are in alinement with a similar arm, 32, extending from knuckle 8, and which arms are connected by a steering cross-link, 33. Said stud axle is provided with an arm, 35, which is connected by a link 38 and pins, 36, 37, to the lower fork member 30 of arm 28, so that when the steering-rod connection, 40, connected to extension 22 of arm 28, is operated by the steering-shaft, 41, the influence of said link 33 will simultaneously actuate the arms 32, 28 and 35 to uniformly position wheels 9 and 11 in the desired direction.

It is desirable for some purposes to throw said wheel 11 at a slight angle in relation to axle 7, which is accomplished by adjusting the screw-bolts 20 to permit the swinging of axle extension 16 on its pivot 12, and thus position said wheel at a slight angle in either forward or backward direction as may be desired.

It will thus be seen that by the action of link 38 with arms 35 and 28 the knuckle or pivotal mounting of wheel 11 at the lower end of extension axle 16 swings said wheel 11 in the direction desired through the manipulation of steering-shaft 41, which operation acts upon arm extension 22 to throw arms 28 and 35 and the link 38 in opposite directions in unison, and such movement of said knuckle 22 also imparts a similar motion to link 33, so that all of said link connections and the wheels 9 and 11 are readily controlled in their movements. As indicated in Figs. 3 and 4, after a furrow is cut, wheel 11 is let thereinto, and as the tractor is propelled said wheel hugs the bank, 50, of the furrow, and thus holds the tractor in position against said bank to constantly follow said furrow, and, therefore, serves as a guide for the purpose.

I claim as my invention:

1. The combination, with a tractor, of a front axle, a knuckle pivotally secured thereto and having forked members, an extension axle secured to said front axle, means for adjusting said extension axle into an angle in relation to said front axle, forked members at the outer end of said extension axle, a wheel having a stud axle pivotally mounted between said forked members, steering means, and a link connected to said extension axle and said knuckle whereby said wheel is steered through the action of said steering means.

2. In a tractor, a front axle, an extension axle having bearings at its inner end for connection with said front axle, means for connecting said extension and front axle, bearings at the outer end of said extension axle, a wheel having a stud axle, means for connecting said stud axle to said outer bearings, a steering knuckle associated with the inner end of said extension axle, a link connecting said stud axle connecting means and said steering knuckle, a steering knuckle at the opposite end of said front axle, a link connecting said steering knuckles, and means for operating said knuckles to steer said wheels.

3. The combination, with a tractor, of a front axle, a wheel mounted thereon, an axle extension pivotally secured to one end of said front axle, a wheel having a stud axle adapted to be attached to said axle extension, pivotal means at the outer end of said extension axle for connecting said stud axle thereto, knuckles at each end of said front axle, a link connecting said knuckles for controlling the movement thereof, a link connected to the inner end of said stud axle and said first-mentioned link, and means for operating said knuckles to simultaneously steer said wheels.

4. In a tractor, an extension axle having pivotally mounted bearings at its inner end for connection to a front axle, pivotally mountable bearings at its outer end for connection to a wheel, an arm connected at said outer end, and a link extending from said arm and adapted to be connected to a steering knuckle.

5. The combination, with a tractor, of a front axle, an extension axle pivotally connected thereto, a steering knuckle pivotally connected to said front axle, a bifurcated arm extending from said knuckle, means for connecting a link to the upper member of said bifurcated arm, an arm extending from the outer end of said extension axle, a link connected to the outer end of said last mentioned arm, and means for pivotally connecting said link to the lower member of said bifurcated arm.

6. In a tractor, the combination, of a front axle, an extension axle, a steering knuckle, means for pivotally connecting said extension axle and knuckle, a wheel having a stud axle mounted in the outer end of said extension axle, means for connecting said extension and stud axles, and a link connecting said stud axle and said steering knuckle.

7. In a tractor, a front axle, an extension axle having bearings at its inner and outer ends, means for attaching its inner end to said front axle, a wheel having a stud axle, means for connecting said stud axle to the outer end of said extension axle, an arm extending from the outer end of said extension axle, a steering knuckle connected to the inner end of said extension axle and having an arm extending therefrom, means connecting said arms, an arm at the opposite end of said front axle, a wheel mounted upon said opposite end of said front axle, a steering link secured to said arm and said connecting means, and a steering rod connected to said knuckle for actuating said steering link to steer said wheels.

In testimony whereof I affix my signature.

DAVID P. DAVIES.